US011170537B2

(12) United States Patent
Masuya et al.

(10) Patent No.: US 11,170,537 B2
(45) Date of Patent: Nov. 9, 2021

(54) VEHICLE DISPLAY DEVICE

(71) Applicant: NIPPON SEIKI CO., LTD., Niigata (JP)

(72) Inventors: Yuki Masuya, Niigata (JP); Takashi Mikami, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 2 days.

(21) Appl. No.: 16/631,028

(22) PCT Filed: Jul. 30, 2018

(86) PCT No.: PCT/JP2018/028472
§ 371 (c)(1),
(2) Date: Jan. 14, 2020

(87) PCT Pub. No.: WO2019/031291
PCT Pub. Date: Feb. 14, 2019

(65) Prior Publication Data
US 2020/0143569 A1    May 7, 2020

(30) Foreign Application Priority Data
Aug. 10, 2017 (JP) .............................. JP2017-155425

(51) Int. Cl.
*G06T 11/00* (2006.01)
*B60K 35/00* (2006.01)

(52) U.S. Cl.
CPC .......... *G06T 11/00* (2013.01); *G06T 11/001* (2013.01); *B60K 35/00* (2013.01);
(Continued)

(58) Field of Classification Search
None
See application file for complete search history.

(56) References Cited

U.S. PATENT DOCUMENTS

2013/0044218 A1*  2/2013  Matsuda .................. G06T 3/00
                                                      348/148
2013/0229513 A1*  9/2013  Ichitani .................... H04N 5/33
                                                      348/135
(Continued)

FOREIGN PATENT DOCUMENTS

EP    2 894 620 A1    7/2015
JP    2008-1182 A     1/2008
(Continued)

OTHER PUBLICATIONS

International Search Report issued in corresponding International Application No. PCT/JP2018/028472, dated Sep. 18, 2018, with English translation.
(Continued)

*Primary Examiner* — James A Thompson
(74) *Attorney, Agent, or Firm* — McDermott Will & Emery LLP

(57) ABSTRACT

A vehicle display device includes a display unit displaying a display image, an image generating unit generating the display image, and a target object information acquiring unit acquiring target object information relating to a target object present at the periphery of a vehicle and outputting the same to the image generating unit. If the distance from the vehicle to the target object exceeds a first reference value, the image generating unit generates an information image of the target object in a sharply visible region, and if the distance from the vehicle to the target object does not exceed the first reference value, the image generating unit generates the information image of the target object in a blurred region, and in that the information image in the blurred region is generated to be less sharply visible than the information image in the sharply visible region.

10 Claims, 10 Drawing Sheets

(52) U.S. Cl.
CPC ............... *B60K 2370/1529* (2019.05); *B60K 2370/166* (2019.05); *B60K 2370/52* (2019.05)

(56) References Cited

U.S. PATENT DOCUMENTS

| | | |
|---|---|---|
| 2013/0249684 A1 | 9/2013 | Hatakeyama et al. |
| 2017/0106750 A1 | 4/2017 | Tauchi et al. |
| 2018/0240258 A1* | 8/2018 | Kosaka .................... G06T 3/20 |
| 2018/0365849 A1* | 12/2018 | Taguchi ............... G05D 1/0246 |
| 2020/0124849 A1* | 4/2020 | Tsuji .................... H04N 9/3194 |

FOREIGN PATENT DOCUMENTS

| | | |
|---|---|---|
| JP | 2015-11666 A | 1/2015 |
| JP | 2015-24709 A | 2/2015 |
| JP | 2016-105256 A | 6/2016 |
| JP | 2017-154613 A | 9/2017 |
| WO | 2017/046937 A1 | 3/2017 |
| WO | 2017/056157 A1 | 4/2017 |

OTHER PUBLICATIONS

Extended European Search Report issued in corresponding European Patent Application No. 18843129.0-1012, dated Jan. 14, 2021.

* cited by examiner

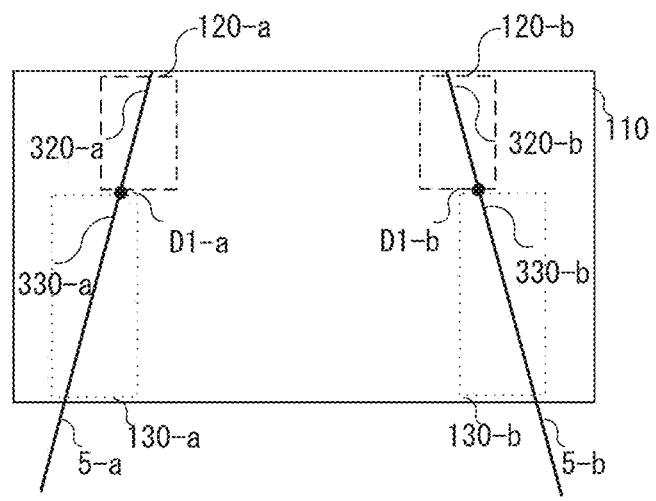
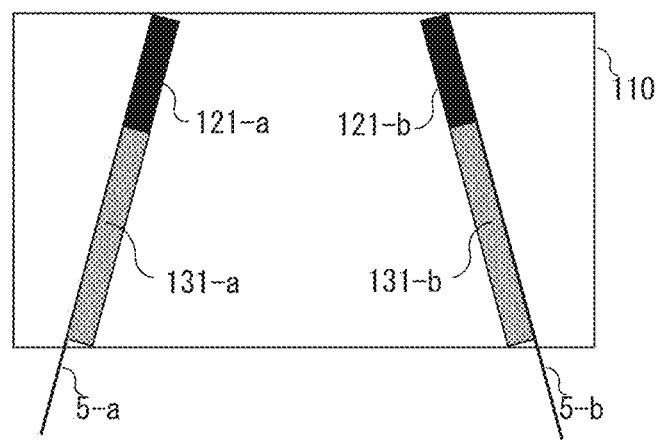

US 11,170,537 B2

VEHICLE DISPLAY DEVICE

CROSS REFERENCE

This application is the U.S. National Phase under 35 U.S.C. § 371 of international Application No. PCT/JP2018/028472, filed on Jul. 30, 2018, which claims the benefit of Japanese Patent Application No. 2017-155425, filed on Aug. 10, 2017, the entire contents of each are hereby incorporated by reference.

TECHNICAL FIELD

The present invention relates to a vehicle display device.

BACKGROUND ART

As a vehicle display device, there is a so-called Head Up Display (HUD) device to allow a passenger sitting in a seat for a driver to visually recognize a virtual image by using light of a display image reflected by a windshield by means of projecting the display image onto a translucent member such as the windshield of the vehicle. For example, the image processing apparatus disclosed in Patent Document 1 detects a relative position of a division line provided on a traveling path with respect to a vehicle, generates a display image so that an approaching display element which is a predetermined display element and a non-approaching display element can be visually recognized by overlapping with a division line, and projects the display image onto the windshield.

PRIOR ART DOCUMENT

Patent Document

Patent Document 1: Japanese Unexamined Patent Application Publication No. 2016-105256

SUMMARY OF THE INVENTION

Problems to be Solved by the Invention

A detection target object in the vicinity of the vehicle is easy to be visually recognized by the passenger and a detected target object far from the vehicle cannot be visually recognized or is hardly visually recognized. That is, it can be said that the importance level of information regarding the detection target object in the vicinity of the vehicle is low, and that the importance level of information regarding the detection target object far from the vehicle is high.

However, in the configuration described in Patent Document 1, since there is no difference in the representation of the virtual image at the vicinity of and far from the vehicle, it is difficult for the passenger to know where he or she should look at her or his eyes, and it is hard to recognize important information that is difficult to visually recognize.

The objective of the present invention is to provide a vehicle display device with which it is possible for a passenger to be made aware more reliably of important information that is difficult to visually recognize.

Solution to Problem

A vehicle display device according to a first aspect of the present invention includes a display unit configured to display a display image, a target object information acquiring unit configured to acquire target object information regarding a target object existing around a vehicle on which the vehicle display device is mounted, and an image generating unit configured to generate the display image, a display region of the display image includes a sharply visible region and a blurred region, the image generating unit generates an information image of the target object in the sharply visible region when a distance from the vehicle to the target object is not less than or greater than a first reference value, and generates the information image of the target object in the blurred region when the distance from the vehicle to the target object is less than or not greater than the first reference value, and the information image in the blurred region is generated to be less sharply visible than the information image in the sharply visible region.

A vehicle display device according to a second aspect of the present invention includes a display unit configured to display a display image, a target object information acquiring unit configured to acquire target object information regarding a target object existing around a vehicle on which the vehicle display device is mounted, and an image generating unit configured to generate the display image, a display region of the display image includes a sharply visible region and a blurred region, the image generating unit generates an information image of the target object in the sharply visible region when a distance from the vehicle to the target object is not less than or greater than a first reference value, and the information image of the target object in the blurred region when the distance from the vehicle to the target object is less than or not greater than the second reference value, the information image in the blurred region is generated to be less sharply visible than the information image in the sharply visible region, and the first reference value is not less than the second reference value.

Effect of the Invention

According to the present invention, it is possible for a passenger to reliably recognize important information that is difficult to visually recognize.

BRIEF DESCRIPTION OF THE DRAWINGS

FIG. 3 is a diagram illustrating the correspondence between the distance from a vehicle to a target object, a sharply visible region, and a blurred region in a first embodiment of the vehicle display device illustrated in FIG. 2.

FIG. 4 is a display example of information image superposition in the first embodiment of the vehicle display device illustrated in FIG. 2.

MODE FOR CARRYING OUT THE INVENTION

The preferred embodiments described below are used to facilitate the understanding of the present invention. Therefore, one skilled in the art should be aware that the present invention is not unduly limited by the embodiments described below.

Figure 1:
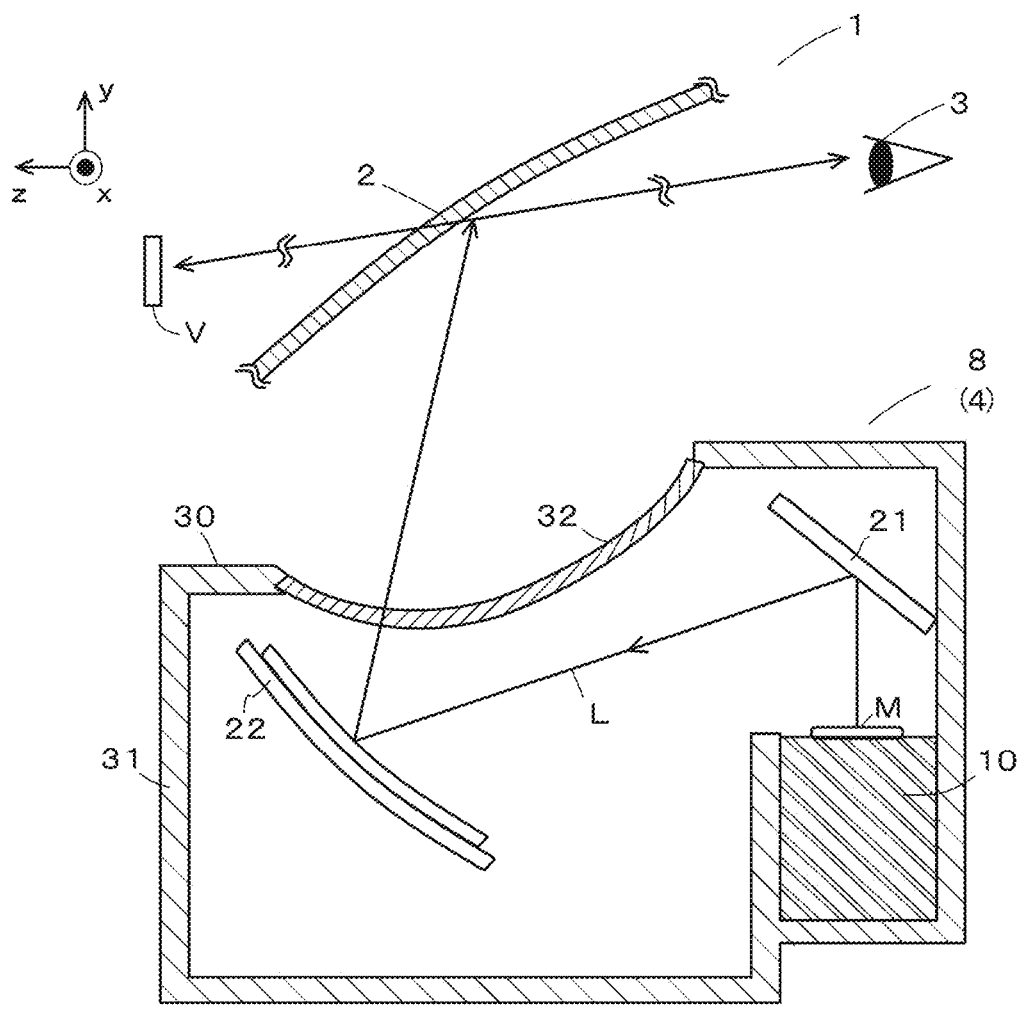
FIG. 1 is a schematic diagram illustrating a configuration of a lead Up Display device which is an embodiment of a vehicle display device.

FIG. 1 illustrates a schematic diagram of a configuration of a Head Up Display device (hereinafter also referred to as a HUD device) 8 which is an embodiment of a vehicle display device 4. The HUD device 8 includes a display unit 10, a planar mirror 21, a curved mirror 22, and a housing 30, and the housing 30 includes a case 31 and a transparent cover 32. The HUD device 8 reflects display light L representing a display image M displayed by the display unit 10 by means of the planar mirror 21 and the curved mirror 22, and outputs the reflected light to a windshield 2 made of a translucent member of a vehicle 1 on which the HUD device 8 is mounted, so that a passenger 3 (usually a driver of the vehicle 1) visually recognizes a virtual image V so as to be superimposed on the real scenery. The contents displayed by the HUD device 8 are various vehicle information, navigation information, Augmented Reality (AR) information, and the like. Further, in the coordinate axes illustrated in FIG. 1, the z-axis positive direction represents the forward direction of the vehicle 1, the y-axis positive direction represents the upper vertical direction, and the x-axis positive direction (vertical upward direction with respect to the drawing) represents the left direction of the vehicle 1.

Figure 2:
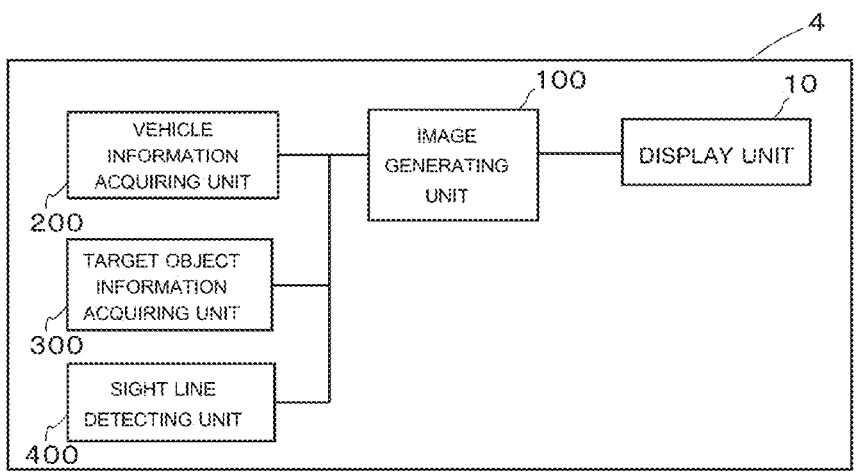
FIG. 2 is a block diagram of the vehicle display device.

FIG. 2 illustrates a block diagram of the vehicle display device 4. The vehicle display device 4 includes the display unit 10, an image generating unit 100, a vehicle information acquiring unit 200, a target object information acquiring unit 300, and a sight line detecting unit 400.

The display unit 10 is composed of a liquid crystal panel module, and displays the display image M generated by the image generating unit 100. As another example, the display unit 10 may be a self-luminous display panel module such as organic Electro Luminescence (EL) elements, a reflective display panel module such as a Digital Micromirror Device (DMD) and a Liquid Crystal on Silicon (LCoS) (registered trademark), a scanning display device that scans with laser light or the like.

The image generating unit 100 includes a circuit, and the circuit includes at least one processor (for example, a Central Processing Unit (CPU), at least one Application Specific Integrated Circuit (ASIC), and/or at least one semiconductor integrated circuit such as a Field-Programmable Gate Array (FPGA). The at least one processor can perform all or part of the functions of the vehicle display device 4 illustrated in FIG. 2 by reading one or more instructions from at least one tangible recording medium which is readable by a computer. The recording medium includes any type of magnetic media such as a hard disk, any type of optical media such as compact disc (CD) and digital versatile disc (DVD), any type of semiconductor memory such as volatile memory, and a non-volatile memory. The volatile memory includes a dynamic random access memory (DRAM) and a static random access memory (SRAM), and the nonvolatile memory includes a read only memory (ROM) and a non-volatile random access memory (NVRAM). The semiconductor memory is also a semiconductor circuit that becomes part of a circuit together with at least one processor. The ASIC is an integrated circuit that is customized to perform all or some of the functions of the vehicle display device 4 illustrated in FIG. 2. The FPGA is an integrated circuit designed to perform all or part of the functions of the vehicle display device 4 illustrated in FIG. 2 after manufacturing. The image generating unit 100 performs image processing on the basis of the information from the vehicle information acquiring unit 200, the target object information acquiring unit 300 and the sight line detecting unit 400, and generates the display image M including at least one information image. The information image is, for example, an AR image for adding information to a real scenery.

The vehicle information acquiring unit 200 detects at least the speed of the vehicle 1, and outputs the detection result to the image generating unit 100 of the vehicle display device 4 via a communication interface such as a Control Area Network (CAN), which is not illustrated. As another example, the vehicle information acquiring unit 200 may include a position information acquisition unit (not illustrated) such as Global Navigation Satellite System (GNSS) including Global Positioning System (GPS), and may estimate the speed of the vehicle 1 from the transition of the position information of the vehicle 1, and output the estimated speed to the image generating unit 100 of the vehicle display device 4.

The target object information acquiring unit 300 includes a stereo camera and a monocular camera. The target object information acquiring unit 300 captures the surroundings including at least the front of the vehicle 1, analyzes the captured image data to obtain target object information relating to a target object around the vehicle 1 (division line, stop line, intersection, curve, pedestrian crossing, pedestrian, other vehicle, position, size, color, distance from the vehicle 1, relative speed with the vehicle 1, etc.), and outputs the target object information to the image generating unit 100 of the vehicle display device 4. As another example, the target object information acquiring unit 300 may acquire the target object information relating to a target object around the vehicle 1 from remote sensing such as Light Detection and Ranging (LIDAR), or vehicle-to-vehicle communication or road-to-vehicle communication such as Vehicle to X (V2X), and output the target object information to the image generating unit 100 of the vehicle display device 4.

The sight line detecting unit 400 includes a stereo camera or a monocular camera, captures a passenger 3 to detect her or his visual line and visual point, and outputs the detection to the image generating unit 100 of the vehicle display device 4.

FIG. 3 illustrates the correspondence between the distance from the vehicle 1 to the target object, a sharply visible region 120, and a blurred region 130 in the first embodiment of the vehicle display device 4 illustrated in FIG. 2. Here, an example in which a division line 5 is detected as the target object will be described.

The division line 5 is generally disposed on the left and right sides of the vehicle 1 to divide the traffic lane. Hereinafter, in order to distinguish the left and right sides of the target object, the division line 5 is called by adding "a" to the target object in the left side of the vehicle 1 (x-axis positive direction), and adding "b" to the target object in the right side of the vehicle 1 (x-axis negative direction). For example, the division line 5 includes a division line 5-a which represents the division line 5 on the left side of the vehicle 1, and a division line 5-b which represents the division line 5 on the right side of the vehicle 1.

The target object information acquiring unit 300 acquires the target object information of the division line 5 which is the target object, and outputs the information to the image generating unit 100. The image generating unit 100 identifies a target object 320 where the distance from the vehicle 1 to the division line 5 which is the target object is not less than the first reference value D1 and a target object 330 where the distance from the vehicle 1 to the division line 5 which is the target object is less than the first reference value D1, on the basis of the target object information. The distance from the vehicle 1 to the target object may be based only on the z-axis direction, a combination of the z-axis direction and the x-axis direction or the y-axis direction, or a combination of the x-axis direction, the y-axis direction, and the z-axis direction. Hereinafter, to distinguish the left and right of the distance from the vehicle 1 to the target object, the distance is called by adding "a" to the distance from the vehicle 1 to the target object on the left side (x-axis positive direction) and adding "b" to the distance from the vehicle 1 to the target object on the right side (x-axis negative direction). For example, the distance includes a first reference value D1-a which represents that the distance from the vehicle 1 to the left target object is the first reference value D1, and a first reference value D1-b, which represents that the distance from the vehicle 1 to the right target object is the first reference value D1.

In a display region 110 of the display image M, a region where the target object 320 exists is defined as the sharply visible region 120, and a region where the target object 330 exists is defined as the blurred region 130. Hereinafter, to distinguish the left and right of each of the sharply visible region and the blurred region, each of the regions is called by adding "a" to each of the sharply visible region and the blurred region on the left side of the vehicle 1 (the positive direction of the x axis), and adding "b" to each of the sharply visible region and the blurred region on the right side of the vehicle 1 (the negative direction of the x axis). For example, the sharply visible region 120 includes a sharply visible region 120-a which represents the sharply visible region 120 on the left side of the vehicle 1, and a sharply visible region 120-b which represents the sharply visible region 120 on the right side of the vehicle 1.

FIG. 4 illustrates a display example of information image superposition in the first embodiment of the vehicle display device illustrated in FIG. 2. In FIG. 4, information image 121 and information image 131 are superimposed on the division line 5. Hereinafter, to distinguish the left and right of the information image, the information image is called by adding "a" to the information image on the left side of the vehicle 1 (the positive direction of the x-axis), and adding "b" to the information image on the right side of the vehicle 1 (the negative direction of the x-axis). For example, the information image 121 includes an information image 121-a which represents the information image 121 on the left side of the vehicle 1, and a sharply visible region 121-b which represents the information image 121 on the right side of the vehicle 1.

The image generating unit 100 generates the information image 121 of the target object 320 in the sharply visible region 120, and the information image 131 of the target object 330 in the blurred region 130. The information image 131 in the blurred region 130 is generated to be less sharply visible than the information image 121 in the sharply visible region 120.

The sharpness and unsharpness of the information image is expressed by the color density of the information image, for example, the information image 121 in the sharply visible region 120 is generated with a deep color, and the information image 131 in the blurred region 130 is generated with a light color.

The passenger 3 becomes more aware of the information image 121 in the sharply visible region 120 than the information image 131 in the blurred region 130, and can reliably recognize the distant target object (for example, a division line shape or a traffic lane).

Further, by blurring the information image in the vicinity of the vehicle 1 where the passenger 3 can visibly recognize with ease, it is possible to reduce discomfort caused by the deviation of the information image and the target object (real scenery) in the vicinity of the vehicle 1.

Figure 5:
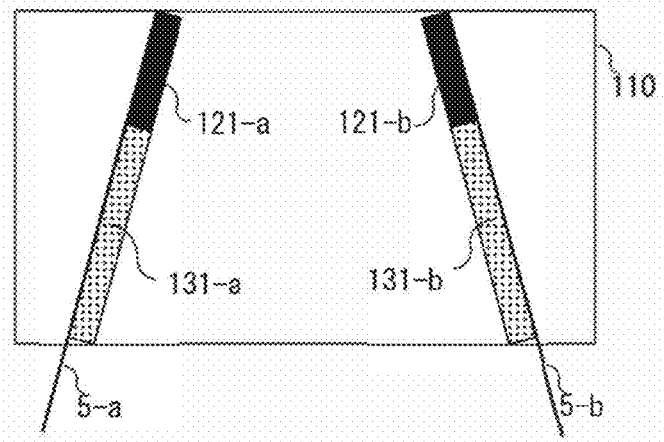
FIGS. 5(A) and 5(B) are another example regarding the expression of the sharpness and unsharpness of an information image in the first embodiment of the vehicle display device illustrated in FIG. 2.
Figure 5:
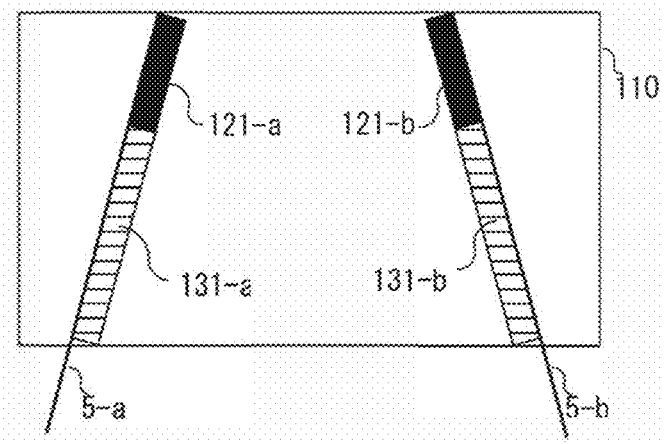

FIGS. 5(A) and 5(B) illustrates another embodiment regarding the expression of the sharpness and unsharpness of the information image in the first embodiment of the vehicle display device illustrated in FIG. 2. As illustrated in FIG. 5(A), for example, lighting of a Light Emitting Diode (LED) of the liquid crystal panel module is represented by a black dot, and the sharpness and unsharpness may be expressed by the brightness of the information image. Alternatively, the brightness of the information image may be controlled by blinking the LED periodically like Duty drive, shifting the position where the light intensity is maximum to the sharply visible region by using an actuator or a rotating shaft not illustrated and so on. Further, as illustrated in FIG. 5(B), the sharpness and unsharpness may be expressed by the density of the stripe pattern of the information image. Furthermore, the gap of the stripe pattern may be displayed in a color close to the target object (real scenery) using the target object information.

Figure 6:
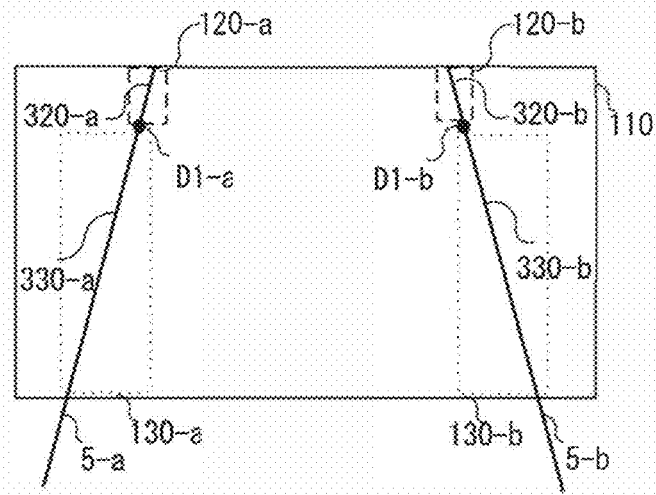
FIG. 6 is a diagram illustrating the correspondence between the distance from the vehicle to the target object, the sharply visible region, and the blurred region when the vehicle speed in the first embodiment of the vehicle display device illustrated in FIG. 2 is larger than the vehicle speed in FIG. 3.

FIG. 6 illustrates the correspondence between the distance from the vehicle to the target object, the sharply visible region, and the blurred region when the speed of the vehicle in the first embodiment of the vehicle display device illustrated in FIG. 2 is larger than the speed of the vehicle in FIG. 3. The vehicle information acquiring unit 200 acquires the speed of the vehicle 1, and outputs the acquired speed to the image generating unit 100. The image generating unit 100 increases the first reference value D1 as the speed of the vehicle 1 increases. Since the speed of the vehicle 1 is larger than that in FIG. 4, the first reference value D1 is increased, the sharply visible region 120 becomes small, and the blurred region 130 becomes large.

Figure 7:
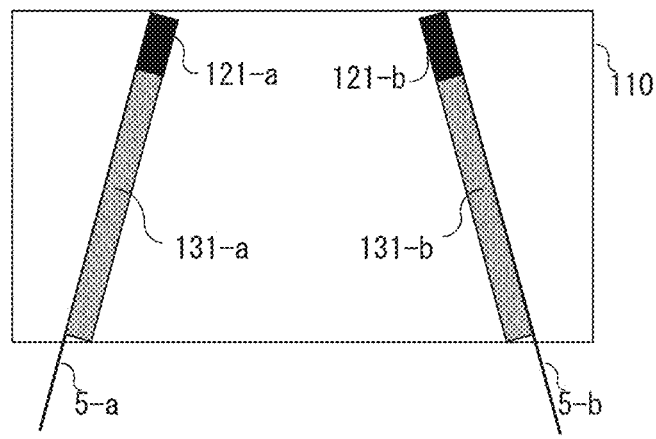
FIG. 7 is a display example when the vehicle speed in the first embodiment of the vehicle display device illustrated in FIG. 2 is larger than the vehicle speed in FIG. 3.

FIG. 7 is a display example when the speed of the vehicle 1 in the first embodiment of the vehicle display device 4 illustrated in FIG. 2 is larger than that in FIG. 3. The image generating unit 100 generates the information image 121 of the target object 320 in the sharply visible region 120, and the information image 131 of the target object 330 in the blurred region 130.

The passenger 3 can adjust her or his viewpoint to a distant place at the same time, by confirming the information image 121 in the sharply visible region 120 which becomes smaller than the information image 131 in the blurred region 130 in ratio. This coincides with the gaze behavior when the vehicle is traveling at high speed, and is felt as a natural information presentation by the passenger 3.

Figure 8:
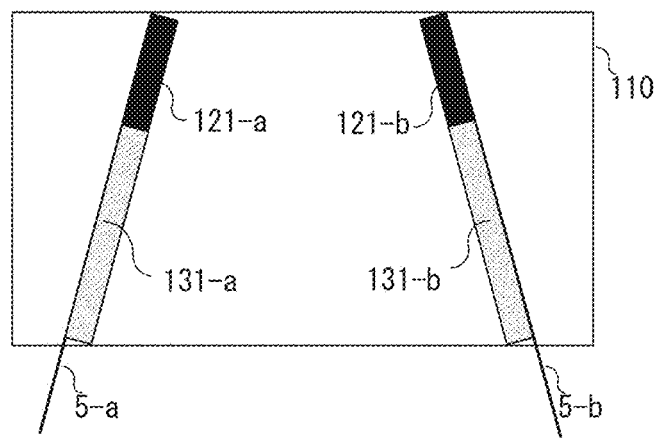
FIG. 8 is a display example when the passenger's viewpoint in the first embodiment of the vehicle display device illustrated in FIG. 2 is in the vicinity of the vehicle.

FIG. 8 is a display example when the viewpoint of the passenger 3 in the first embodiment of the vehicle display device 4 illustrated in FIG. 2 is in the vicinity of the vehicle 1. The sight line detecting unit 400 captures the passenger 3, detects her or his sight line and viewpoint, and outputs the detection to the image generating unit 100. When the distance from the vehicle 1 to the viewpoint of the passenger 3 is less than the first reference value D1, the image generating unit 100 generates the information image 131 in the blurred region 130 to be less sharply visible in comparison with a case where the distance from the vehicle 1 to the viewpoint of the passenger 3 is not less than the first reference value D1. For example, the image generating unit 100 generates the information image 131 so that the color density of the information image 131 becomes lighter. The distance may be based only on the z-axis direction, a combination of the z-axis direction and the x-axis direction or the y-axis direction, or a combination of the x-axis direction, the y-axis direction, and the z-axis direction.

The passenger 3 becomes to look toward the information image 121 in the sharply visible region 120 rather than the information image 131 in the blurred region 130 which has become more blurred, and can more reliably recognize the distant target object (for example, division line shape or traffic lane).

Figure 9:
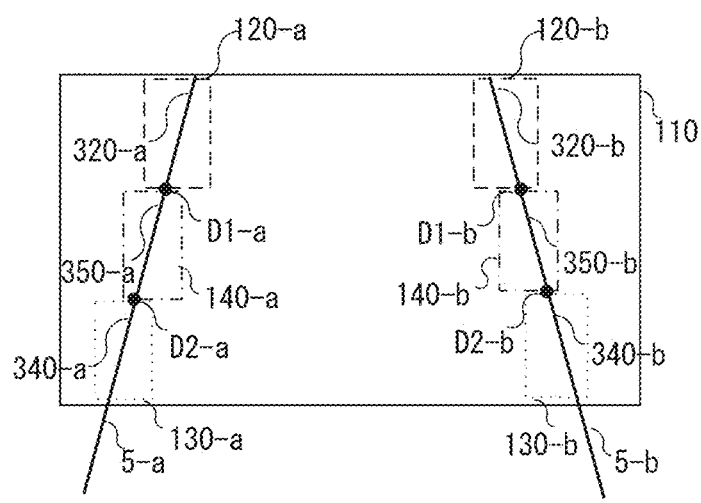
FIG. 9 is a diagram illustrating the correspondence between the distance from a vehicle to a target object, a sharply visible region, and a blurred region in a second embodiment of the vehicle display device illustrated in FIG. 2.

FIG. 9 is a diagram illustrating the correspondence between the distance from the vehicle 1 to the target object, the sharply visible region 120 and the blurred region 130 in the second embodiment of the vehicle display device 4 illustrated in FIG. 2. In the second embodiment of the vehicle display device 4, the first reference value D1 is not less than the second reference value D2. When the first reference value D1 is equal to the second reference value D2, the configuration is the same as that of the first embodiment of the vehicle display device 4.

The target object information acquiring unit 300 acquires the target object information of the division line 5 which is the target object, and outputs the information to the image generating unit 100. The image generating unit 100 identifies the target object 320 where the distance from the vehicle 1 to the division line 5 that is the target object is not less than the first reference value D1 and the target object 340 where the distance from the vehicle 1 to the division line 5 that is the target object is less than the second reference value D2, on the basis of the target object information. It is preferable that the image generating unit 100 further identifies a target object 350 which is not less than the second reference value D2 and less than the first reference value D1. The distance from the vehicle 1 to the target object may be based on only the z-axis direction, a combination of the z-axis direction and the x-axis direction or the y-axis direction, or a combination of the x-axis direction, the y-axis direction, and the z-axis direction.

In the display region 110 of the display image M, the image generating unit 100 sets the region where the target object 320 exists as the sharply visible region 120 and the region where the target object 330 exists as the blurred region 130. The image generating unit 100 further sets the region where the target object 350 exists as an intermediate region 140, for example. Hereinafter, in order to distinguish the left and right of the intermediate region, the intermediate region is called by adding "a" to the intermediate region on the left side of the vehicle 1 (x-axis positive direction), and adding "b" to the intermediate region on the right side of the vehicle 1 (x-axis negative direction). For example, the intermediate region 140 includes an intermediate region 140-a which represents the intermediate region 140 on the left side of the vehicle 1 and, an intermediate region 140-b which represents the intermediate region 140 on the right side of the vehicle 1.

Figure 10:
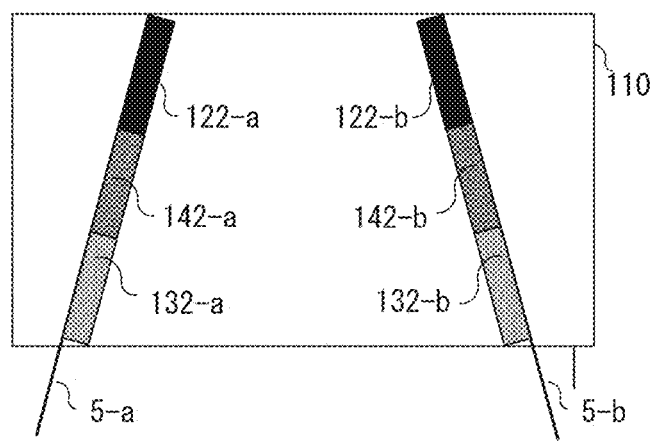
FIG. 10 is a display example of information image superposition in the second embodiment of the vehicle display device illustrated in FIG. 2.

FIG. 10 is a display example of information image superposition in the second embodiment of the vehicle display device 4 illustrated in FIG. 2. The image generating unit 100 generates the information image 122 of the target object 320 in the sharply visible region 120, and the information image 132 of the target object 340 in the blurred region 130. The image generating unit 100 further generates the information image 142 of the target object 350 in the intermediate region 140. The information image 132 in the blurred region 130 is generated to be less sharply visible than the information image 122 in the sharply visible region 120. It is desirable that the information image 142 in the intermediate region 140 is generated more sharply than the information image 132 in the blurred region 130, and less sharply than the information image 122 in the sharply visible region 120.

The passenger 3 becomes more aware of the information image 122 in the sharply visible region 120 than the information image 132 in the blurred region 130 and the information image 142 in the intermediate region 140, and can reliably recognize the shape of the distant division line (traffic lane).

Figure 11A:
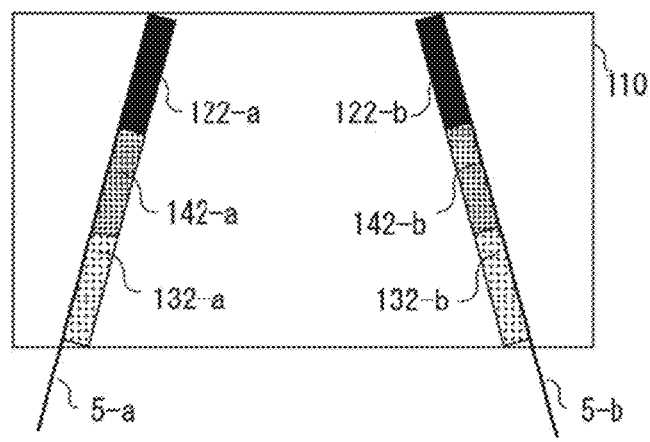
FIGS. 11(A) to 11(C) are another example regarding the expression of the sharpness and unsharpness of an information image in the second embodiment of the vehicle display device illustrated in FIG. 2.
Figure 11B:
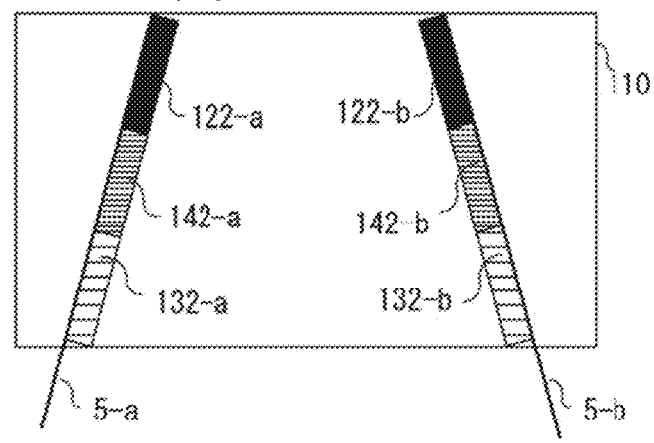
Figure 11:
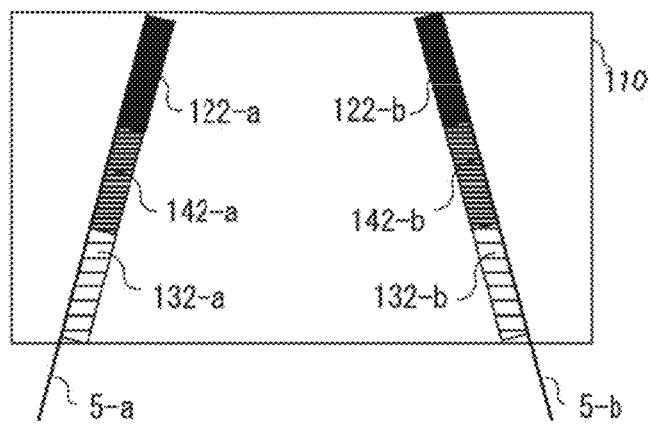

FIGS. 11(A) to 11(C) illustrates another example regarding the expression of the sharpness and unsharpness of the information image in the second embodiment of the vehicle display device illustrated in FIG. 2. That is, the sharpness and unsharpness may be expressed by the brightness of the information image as FIG. 11(A), the sharpness and unsharpness may be expressed by the density of the stripe pattern of the information image as FIG. 11(B), and the sharpness and unsharpness may be expressed by the density of the stripe pattern of the information image and the width of the line width as illustrated in FIG. 11(C).

Figure 12:
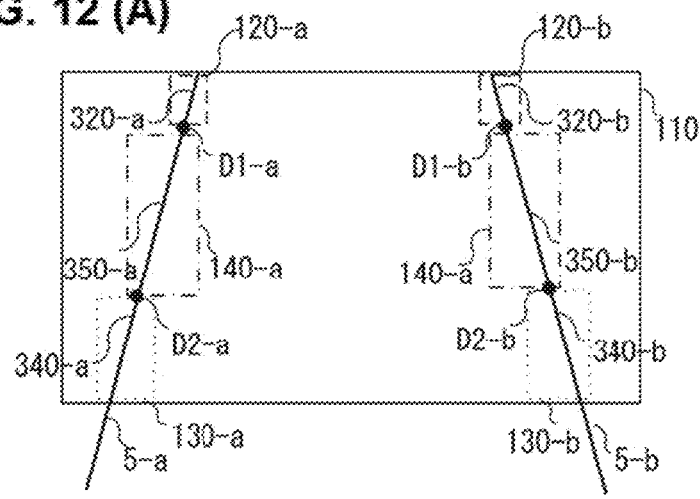
FIGS. 12(A) to 12(C) are a diagram illustrating the correspondence between the distance from the vehicle to the target object, the sharply visible region, and the blurred region when the vehicle speed in the second embodiment of the vehicle display device illustrated in FIG. 2 is larger than the vehicle speed in FIG. 9.
Figure 12:
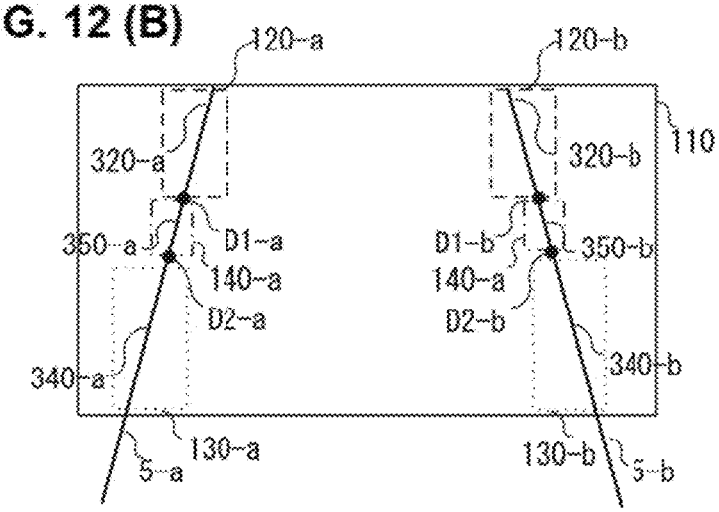
Figure 12:
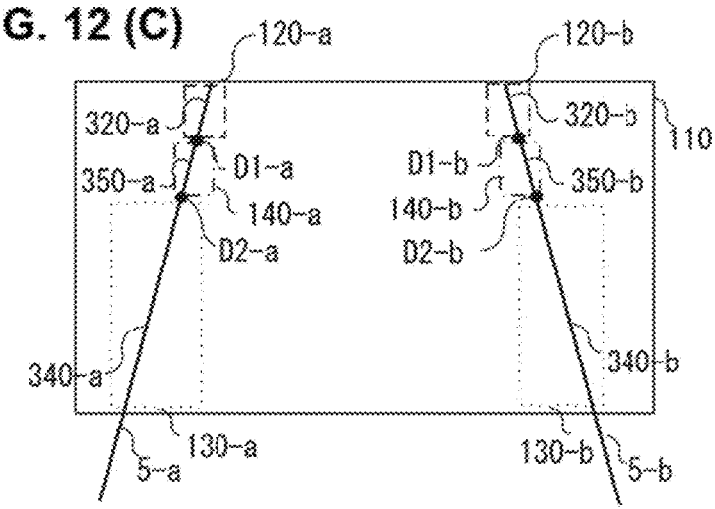

FIGS. 12(A) to 12(C) are diagrams illustrating the correspondence between the distance from the vehicle to the target object, the sharply visible region, and the blurred region when the speed of the vehicle 1 in the second embodiment of the vehicle display device 4 illustrated in FIG. 2 is larger than that in FIG. 9. The vehicle information acquiring unit 200 acquires the speed of the vehicle 1, and outputs the speed to the image generating unit 100. The image generating unit 100 increases the first reference value D1 and the second reference value D2 as the speed of the vehicle 1 increases. In FIG. (12A), since the speed of the vehicle 1 is larger than that in FIG. 9, the first reference value D1 increases and the sharply visible region 120 decreases. In FIG. 12(B), the speed of the vehicle 1 is larger than that in FIG. 9, the second reference value D2 increases and the blurred region 130 increases. In FIG. 12 (C), since the speed of the vehicle 1 is larger than that in FIG. 9, the first reference value D1 and the second reference value D2 increase, the sharply visible region 120 decreases, and the blurred region 130 increases.

Figure 13:
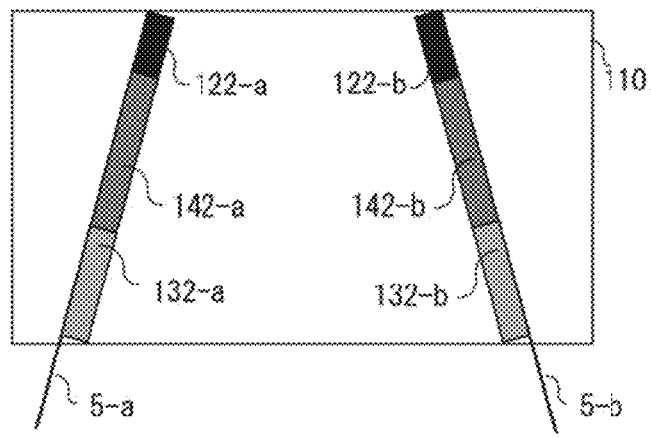
FIGS. 13(A) to 13(C) illustrates a display example when the vehicle speed in the second embodiment of the vehicle display device illustrated in FIG. 2 is larger than the vehicle speed in FIG. 9.
Figure 13:
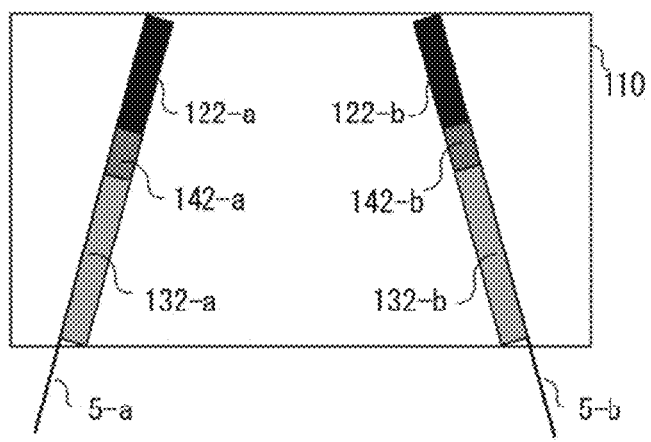
Figure 13:
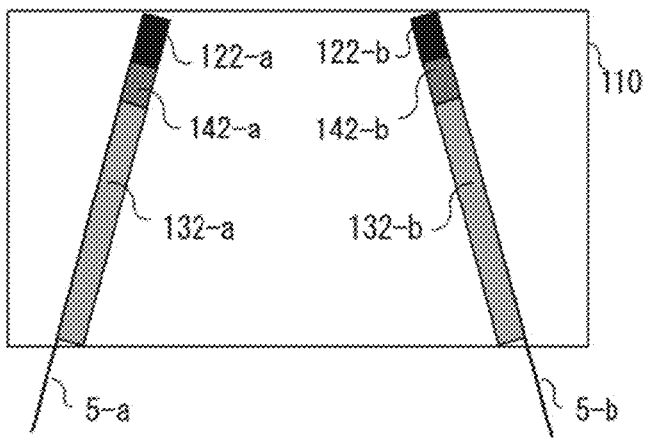

FIGS. 13(A) to 13(C) are a display example when the speed of the vehicle 1 in the second embodiment of the vehicle display device 4 illustrated in FIG. 2 is larger than that in FIG. 9. The image generating unit 100 generates the information image 122 of the target object 320 in the sharply visible region 120, and the information image 132 of the target object 340 in the blurred region 130. Further, the image generating unit 100 generates the information image 142 of the target object 350 in the intermediate region 140.

The passenger 3 can adjust her or his viewpoint to a distant place at the same time, by confirming the information image 122 in the sharply visible region 120 which becomes smaller than the information image 132 in the blurred region 130 in ratio. This coincides with the gaze behavior when the vehicle is traveling at high speed, and is felt as a natural information presentation by the passenger 3.

Figure 14:
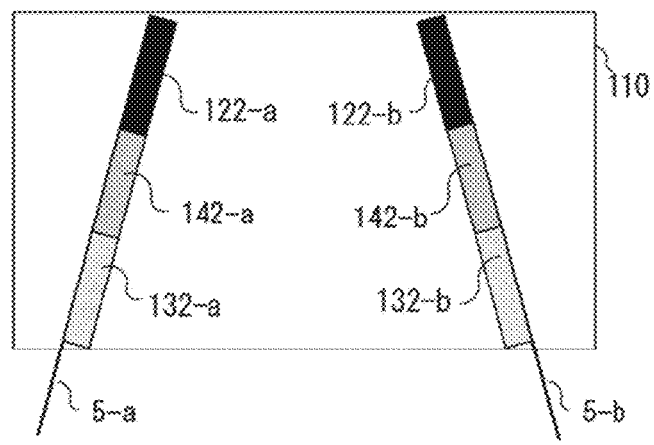
FIG. 14 is a display example when the passenger's viewpoint in the second embodiment of the vehicle display device illustrated in FIG. 2 is in the vicinity of the vehicle.

FIG. 14 is a display example when the viewpoint of the passenger 3 in the second embodiment of the vehicle display device illustrated in FIG. 2 is in the vicinity of the vehicle 1. The sight line detecting unit 400 captures the passenger 3, detects her or his sight line and viewpoint, and outputs the detection to the image generating unit 100. When the distance from the vehicle 1 to the viewpoint of the passenger 3 is less than the first reference value D1, the image generating unit 100 generates the information image 132 in the blurred region 130 to be less sharply visible in comparison with the case where the distance from the vehicle 1 to the viewpoint of the passenger 3 is not less than the first reference value D1. For example, the image generating unit 100 generates the information image 132 with a lighter color density. At this time, the image generating unit 100 may generate the information image 142 in the intermediate region 140 to be less sharply visible. It is desirable that the information image 142 in the intermediate region 140 is generated more sharply than the information image 132 in the blurred region 130, and less sharply than the information image 122 in the sharply visible region 120. The distance may be based only on the z-axis direction, a combination of the z-axis direction and the x-axis direction or the y-axis direction, or a combination of the x-axis direction, the y-axis direction, and the z-axis direction.

The passenger 3 becomes to look toward the information image 121 in the sharply visible region 120 rather than the information image 131 in the blurred region 130 which has become more blurred, and can more reliably recognize the distant target object (for example, the division line shape or the traffic lane).

Figure 15:
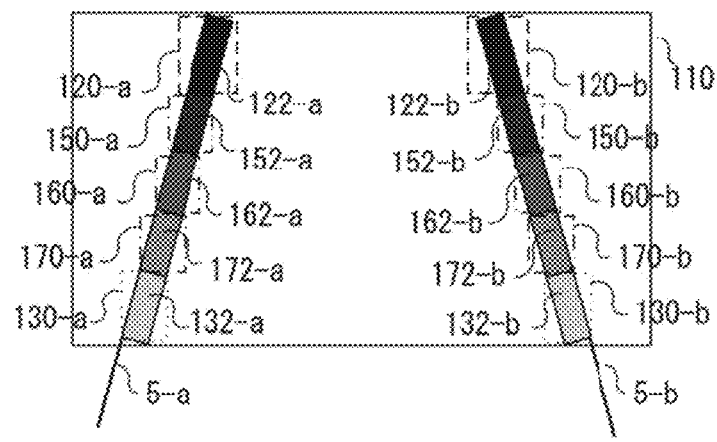
FIGS. 15(A) and 15(B) are another display example of the information image superposition in the second embodiment of the vehicle display device illustrated in FIG. 2.
Figure 15:
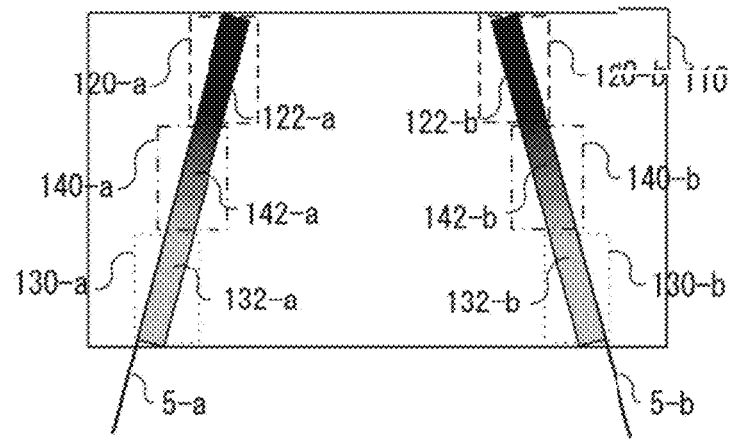

FIGS. 15(A) and 15(B) are another display example of information image superposition in the second embodiment of the vehicle display device 4 illustrated in FIG. 2.

As illustrated in FIG. 15(A), a plurality of intermediate regions 150, 160 and 170 may be provided between the sharply visible region 120 and the blurred region 130, and information images 122, 132, 152, 162 and 172 may be generated.

Further, as illustrated in FIG. 15(B), the information image 122 in the sharply visible region 120 and the information image 132 in the blurred region 130 may be connected to each other by smoothing the expression of the sharpness and unsharpness using the information image 142 in the intermediate region 140.

Figure 16:
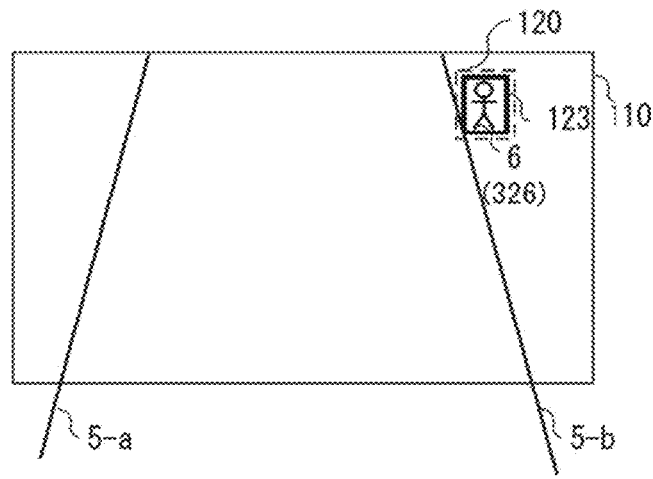
FIGS. 16(A) and 16(B) are a display example of pedestrian detection in the vehicle display device illustrated in FIG. 2.
Figure 16:
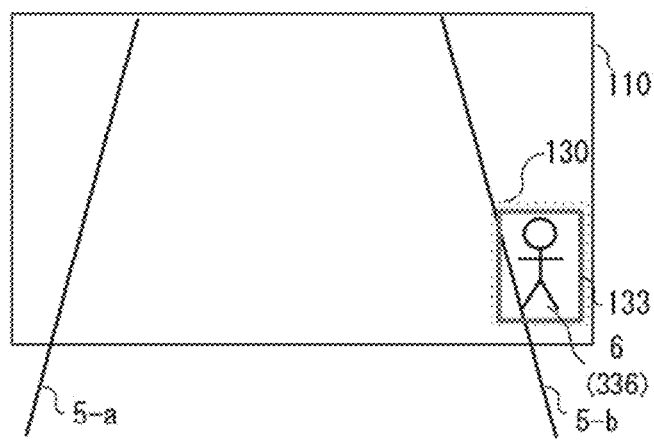

FIGS. 16(A) to 16B are a display example of pedestrian detection. in the vehicle display device 4 illustrated in FIG. 2.

FIG. 16(A) illustrates an example of a case where a pedestrian 6 is detected as the target object at a certain time in the distance from the vehicle 1. When the first embodiment of the vehicle display device 4 is used, the target object information acquiring unit 300 acquires target object information of the pedestrian 6 which is the target object, and outputs the target object information to the image generating unit 100. The image generating unit 100 identifies a target object 326 where the distance from the vehicle 1 to the target object is not less than the first reference value D1 on the basis of the target object information. The image generating unit 100 sets the region where the target object 326 exists in the display region 110 of the display image M as the sharply visible region 120, and generates the information image 123 of the target object 326 in the sharply visible region 120.

FIG. 16(B) illustrates an example of a case where the pedestrian 6 is detected in the vicinity of the vehicle 1 as the target object by moving forward of the vehicle 1 or by walking of the pedestrian 6 for a certain time from the time. The target object information acquiring unit 300 acquires target object information of the pedestrian 6 which is the target object, and outputs the information to the image generating unit 100. The image generating unit 100 outputs, to the image generating unit 100, a target object 336 in which the distance from the vehicle 1 to the target object is less than the first reference value D1 on the basis of the target object information. The image generating unit 100 sets the region where the target object 336 exists in the display region 110 of the display image M as the blurred region 130, and generates the information image 133 of the target object 336 in the blurred region 130.

The passenger 3 can surely recognize the pedestrian 6 located at the distant distance, and does not feel the hassle due to excessive information presentation for the pedestrian 6 where the distance becomes close and who becomes easy to visibly recognize because of the time elapsed.

Figure 17:
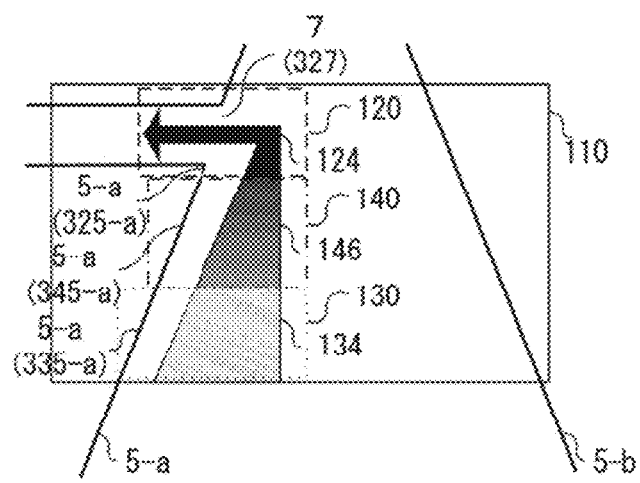
FIG. 17 is a display example of a direction indication in the vehicle display device illustrated in FIG. 2.

FIG. 17 is a display example of direction indication in the vehicle display device 4 illustrated in FIG. 2, and illustrates an example when the division line 5 and an intersection 7 are detected as target objects. When the second embodiment of the vehicle display device 4 is used, the target object information acquiring unit 300 acquires target object information of the division line 5 and the intersection 7 which are the target objects, and outputs the information to the image generating unit 100. The image generating unit 100 outputs to the image generating unit 100 target objects 325 and 327 where the distance from the vehicle 1 to the target object are not less than the first reference value D1, a target object 335 less than the second reference value D2, and a target object 345 which is not less than the second reference value D2 and less than the first reference value D1, on the basis of the target object information. The image generating unit 100 sets the region where the target objects 325 and 327 exist in the display region 110 of the display image M as the sharply visible region 120, the region where the target object 335 exists as the blurred region 130, and the region where the target object 345 exists as the intermediate region 140. The image generating unit 100 generates the information image 124 of the target objects 325 and 327 in the sharply visible region 120, the information image 134 of the target object 335 in the blurred region 130, and the information image 146 of the target object 345 in the intermediate region 140.

The passenger 3 can reliably recognize the intersection 7 located at the distant distance, and can easily feel the coincidence with the real scenery on the route to the intersection 7.

In the above embodiments, the distance from the vehicle 1 to the target object is not less than the first reference value D1, less than the first reference value D1, and less than the second reference value D2. However, the same effect can be obtained even when the distance from the vehicle 1 to the target object is greater than the first reference value D1, not greater than the first reference value D1, and not greater than the second reference value D2.

In the above embodiments, the distance from the vehicle 1 to the target object is used as the reference value. However, the arrival time of the vehicle 1 to the target object may be used as the reference value, taking into account the speed of the vehicle 1 or the speed of the target object.

In the above embodiments, the sharply visible region 120 and the blurred region 130 are represented by rectangles, but may be represented by a different figure such as a circle or along the outline of the target object.

In the above embodiments, the display unit 10 may display another information image on the display image M together with the information image. For example, the other information image is such as speed of the vehicle 1.

In the above embodiments, the windshield type HUD device is used as an example of the vehicle display device 4, but a combiner type HUD device can also be used.

The above embodiments are also applicable to a display device such as a Head Mounted Display including a smart glass.

DESCRIPTION OF REFERENCE NUMERALS 1 vehicle
2 windshield
3 passenger
4 vehicle display device
5 division line
6 pedestrian
7 intersection
8 Head Up Display device
10 display unit
21 planer mirror
22 curved mirror
30 housing
100 image generating unit
110 display region
120 sharply visible region
121 information image
130 blurred region
131 information image
140 intermediate region
142 information image
200 vehicle information acquiring unit
300 target object information acquiring unit
320 target object not less than a first reference value
330 target object less than a first reference value
340 target object less than a second reference value
400 sight line detecting unit D1 first reference value
D2 second reference value

The invention claimed is:

1. A vehicle display device comprising:
a target object information acquiring unit configured to acquire target object information regarding a target object existing around a vehicle on which the vehicle display device is mounted;
an image generating unit configured to generate a display image according to the target object information; and
a display unit configured to display the generated display image,
wherein the display image includes a sharply visible region and a blurred region,
wherein the image generating unit generates an information image of the target object in the sharply visible region when a distance from the vehicle to the target object is greater than a first reference value, and generates the information image of the target object in the blurred region when the distance from the vehicle to the target object is less than the first reference value, and
wherein the information image in the blurred region is generated to be less sharply visible than the information image in the sharply visible region.

2. The vehicle display device according to claim 1, wherein the image generating unit increases the first reference value as speed of the vehicle increases.

3. The vehicle display device according to claim 1, wherein when a distance from the vehicle to a viewpoint of a passenger of the vehicle is less than or not greater than the first reference value, the image generating unit generates the information image in the blurred region to be less sharply visible in comparison with a case where the distance from the vehicle to the viewpoint of the passenger of the vehicle is not less than or greater than the first reference value.

4. The vehicle display device according to claim 1, wherein the information image is superimposed on the target object.

5. A vehicle display device comprising:
a target object information acquiring unit configured to acquire target object information regarding a target object existing around a vehicle on which the vehicle display device is mounted;
an image generating unit configured to generate a display image according to the target objection information; and
a display unit configured to display the generated display image,
wherein the display image includes a sharply visible region and a blurred region,
wherein the image generating unit generates an information image of the target object in the sharply visible region when a distance from the vehicle to the target object is greater than a first reference value, and generates the information image of the target object in the blurred region when the distance from the vehicle to the target object is less than a second reference value,
wherein the information image in the blurred region is generated to be less sharply visible than the information image in the sharply visible region, and
wherein the first reference value is not less than the second reference value.

6. The vehicle display device according to claim 5, wherein the image generating unit increases the first reference value as speed of the vehicle increases.

7. The vehicle display device according to claim 5, wherein the image generating unit increases the second reference value as the speed of the vehicle increases.

8. The vehicle display device according to claim 5, wherein the image generating unit increases the first reference value and the second reference value as the speed of the vehicle increases.

9. The vehicle display device according to claim 5, wherein when the distance from the vehicle to a viewpoint of a passenger of the vehicle is less than or not greater than the first reference value, the image generating unit generates the information image in the blurred region to be less sharply visible in comparison with a case where the distance from the vehicle to the viewpoint of the passenger of the vehicle is not less than or greater than the first reference value.

10. The vehicle display device according to claim 5, wherein the information image is superimposed on the target object.

\* \* \* \* \*